Sept. 6, 1955　　　　　H. L. BOURNER　　　　　2,716,820
DRYING APPARATUS
Filed Nov. 26, 1952　　　　　　　　　　　　8 Sheets-Sheet 2

INVENTOR
HOWARD L. BOURNER
BY Cushman, Darby & Cushman
ATTORNEYS

Sept. 6, 1955    H. L. BOURNER    2,716,820
DRYING APPARATUS
Filed Nov. 26, 1952    8 Sheets-Sheet 3

INVENTOR
HOWARD L. BOURNER

BY Cushman, Darby & Cushman
ATTORNEYS

Sept. 6, 1955

H. L. BOURNER 2,716,820

DRYING APPARATUS

Filed Nov. 26, 1952

INVENTOR
HOWARD L. BOURNER

BY Cushman, Darby & Cushman

ATTORNEYS

Sept. 6, 1955　　　H. L. BOURNER　　　2,716,820
DRYING APPARATUS
Filed Nov. 26, 1952　　　8 Sheets-Sheet 5

INVENTOR
HOWARD L. BOURNER

ATTORNEYS

Sept. 6, 1955    H. L. BOURNER    2,716,820
DRYING APPARATUS
Filed Nov. 26, 1952    8 Sheets-Sheet 6

INVENTOR
HOWARD L. BOURNER

BY Cushman, Darby & Cushman
ATTORNEYS

Sept. 6, 1955     H. L. BOURNER     2,716,820
DRYING APPARATUS Filed Nov. 26, 1952     8 Sheets-Sheet 7

INVENTOR
HOWARD L. BOURNER

BY Cushman, Darby & Cushman
ATTORNEYS

Sept. 6, 1955 H. L. BOURNER 2,716,820
DRYING APPARATUS
Filed Nov. 26, 1952 8 Sheets-Sheet 8

INVENTOR
HOWARD L. BOURNER
BY *Cushman, Darby & Cushman*
ATTORNEYS 2,716,820
Patented Sept. 6, 1955

2,716,820

DRYING APPARATUS

Howard L. Bourner, Nashville, Tenn., assignor to Temco, Inc., Nashville, Tenn., a corporation of Tennessee Application November 26, 1952, Serial No. 322,776

1 Claim. (Cl. 34—82)

This invention pertains to a drying apparatus and particularly to laundry dryers.

Apparatus according to the present invention is of the general type having a tumbling tub in which laundry is placed and through which heated air is moved to absorb moisture from the laundry.

A primary object of this invention is to provide an improved laundry dryer of the type described which may be economically produced and operated.

It is a further object of this invention to provide a dryer of the type described wherein the path of heated air is first through the tumbling tub, then through a lint collecting trap, then through an impeller and then through a venting box and out of the dryer.

It is a further object of this invention to provide a laundry dryer wherein the tub is rigidly supported in cantilever fashion from a column extending upwardly from a base.

It is a further object of this invention to provide a laundry dryer having a venting arrangement to permit moist air to be vented from the rear of the apparatus or from the side thereof through vent piping, or directly upwardly and into the room in which the apparatus is located.

It is a further object of this invention to provide a novel motor mounting means for a dryer of the type described which will insure correct alignment of the motor and an impeller and pulley affixed thereto.

It is a further object of this invention to provide a novel clean-out arrangement associated with the tumbling tub.

It is a further object of this invention to provide a novel construction of a rotatable tub for dryers of the type described, having a rigid cantilever mounting structure fabricated from sheet metal parts.

Further objects and the entire scope of the invention will become further apparent from the following detailed description and from the appended claim, wherein said further objects will be either expressly set forth or obvious.

The invention or this application constitutes an improvement over the invention or my copending application Serial No. 188,610, filed October 5, 1950, now Patent No. 2,664,646.

One exemplary embodiment of the invention may be best understood with reference to the accompanying drawings, in which.

General Description

By reference to Figures 1–4 and 8 it will be readily observed that the dryer according to the present invention is so constructed as to be generally box-like in construction having a door in the front thereof for inserting laundry to be dried into a rotatable tumbling tub.

Figure 1:
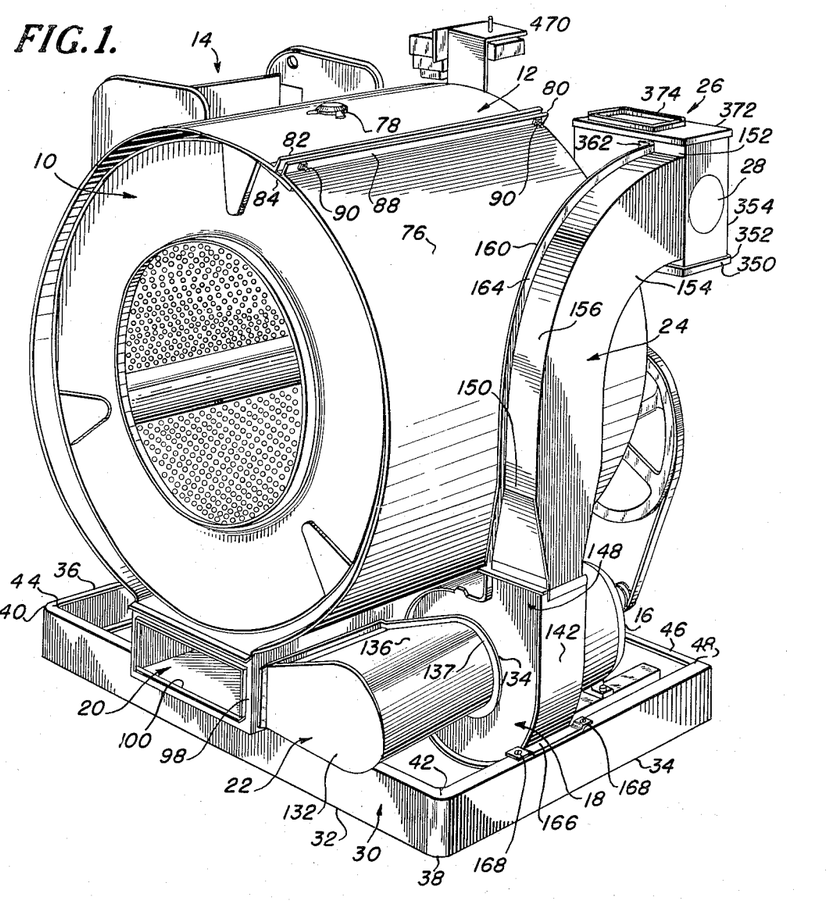
Figure 1 shows a view of the dryer of the present invention with parts forming a cabinet removed.

Referring first primarily to Figure 1 for a general description, the rotatable tumbling tub is designated generally as 10. This tub is within a drum designated generally as 12. A suitable heating unit, which may be either electricity or gas-consuming is designated 14. A motor 16 is provided for revolving the tumbling tub 10 through suitable pulleys and also for driving a blower impeller located within a housing 18. The drum 12 is provided with a box-like base section 20 having one outlet extending into a blower input duct 22. With the impeller within housing 18 being driven by motor 16, outside air will be drawn across the heating elements of heater 14 and thence through openings (not shown in Figure 1) in drum 12 through the perforated periphery of tumbling tub 10 downwardly through the base section 20 of drum 12, wherein a lint trap (not shown in Figure 1) is located. The air now containing moisture from damp fabric in the tub 10 will pass through duct 22, past the impeller in housing 18 and thence upwardly through blower output duct 24 to a vent box 26. Means are provided for selectively exhausting the damp air from vent box 26 either directly upward, to the rear of the machine, or to the side of the machine through apertures such as one which may be formed by removing the knock-out section 28 in vent box 26.

Base

Figure 3:
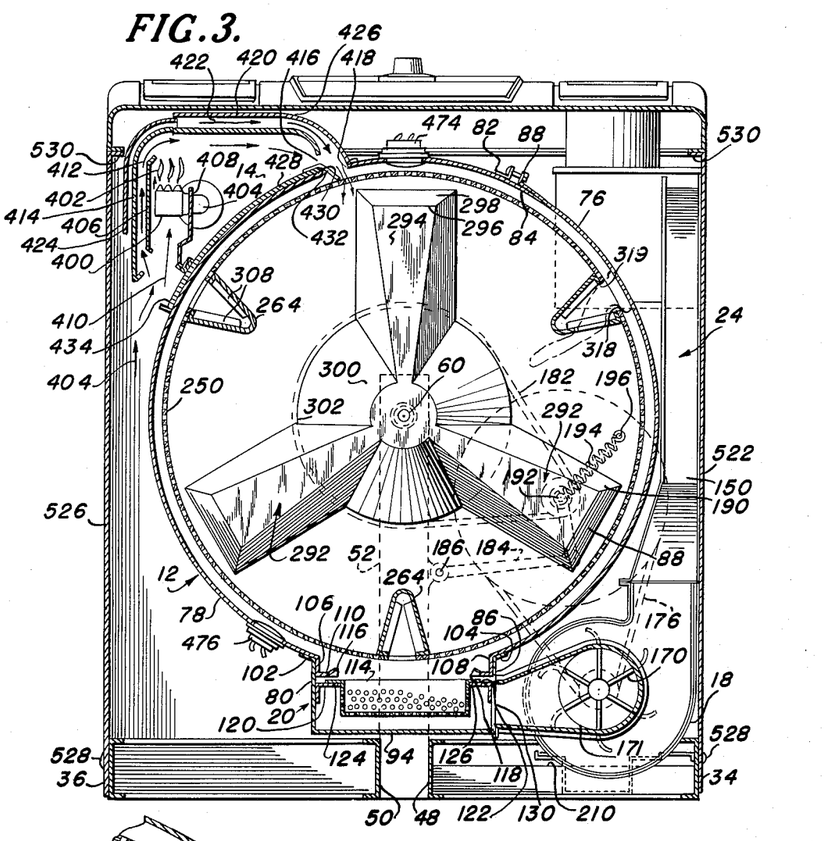
Figure 3 shows a front elevational view of the dryer in cross-section.
Figure 4:
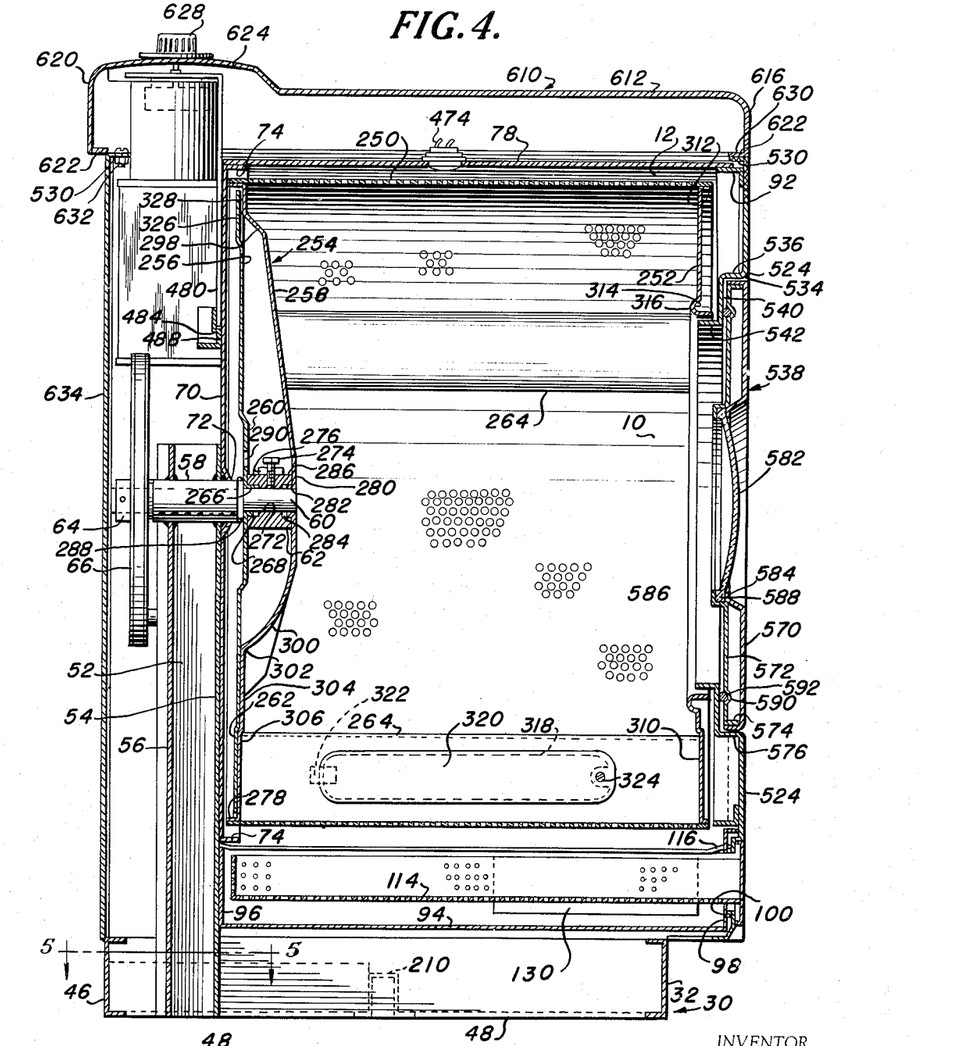
Figure 4 shows a side cross-sectional view of the dryer substantially along the line 4—4 of Figure 2.

Continuing now with the description of the dryer in detail, with particular reference to Figures 1, 3 and 4, there is provided a base 30 formed by bending an elongated C-channel so as to form a front base member 32, a right-hand side base member 34 and a left-hand base member 36. The C-channel is so arranged that the broad face is arranged vertically with the edges thereof horizontal and facing inwardly as is clearly shown in Figure 1. To present a smooth contour at the corners between front member 32 and side members 34 and 36, respectively, the horizontal edges may be cut out, the channel then bent to form a curved corner as at 38 and 40 (Figure 1) and the cut-out portions of the edges where joining may be welded as at 42 and 44.

A rear base member 46 may be formed by a similar C-channel having the horizontal edges cut back at either end thereof so as to permit welding of these edges to the horizontal edges of members 34 and 36 as at weld 48 shown in Figure 1. The vertical portion of the back base member 46 may be permitted to extend out to meet the inner surface of the vertical portion of the side members 34 and 36 and also be welded thereto.

Throughout this specification it will be understood that screws, bolts, welds or other conventional fastening means may be employed.

Tub Support

The tumbling tub 10 is rotatably supported from the base 30 in the following manner: Referring to Figures 1–4, across the central portion of the base from front to rear there extend a right-hand column support channel 48 and a left-hand column support channel 50. Channels 48 and 50 may be of a similar C-cross-section as in the base 30 and arranged to have their vertical faces toward one another with the horizontal edges extending away from each other. Toward the rear of the machine a tub support column 52 (Figs. 2–4) extends upwardly from between the column support channels 48 and 50.

Figure 5:
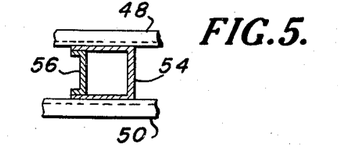
Figure 5 shows a detail of construction taken substantially along the line 5—5 of Figure 4.

The column 52 is formed by a first structural member 54 bent to have sides thereof extending rearwardly past a second structural member 56. The latter member also has edges turned rearwardly to mate with a portion of the sides of the member 54, all as shown in Figure 5. It will be observed that the two structural members 54 and 56 form a box-like channel and the lower end portion thereof may be welded to the column support members 48 and 50 to provide a rigid structure.

The tub supporting column 52 extends as described a short distance above the axis of the tub 10 and through apertures in the members 54 and 56 there is inserted a bearing sleeve 58 (Fig. 4) in which may be placed suitable bronze bushings in which a tub support shaft 60 may rotate. The shaft 60 extends from either end of the sleeve 58 and at one end has secured thereto a tub supporting bushing 62 and at the other end the hub 64 of a pulley 66 for revolving the tub. The tub structure and the pulley arrangement will be described more fully hereinbelow. However, it may be mentioned at this point that the tub 10 is suspended in cantilever fashion from the shaft 60 and no additional supporting structure is provided at the front of the tub.

Drum

The drum 12 which encloses the tub 10 will now be described in detail. Referring primarily to Figure 4 this drum comprises a rear end plate 70 having an aperture therein designated 72 for fitting closely about the sleeve 58 where the latter extends forwardly from the structural member 54 of column 52. The end plate 70 is substantially flat as shown and is of circular plan. Along the circumferential edge of end plate 70 there is an inturned rim 74 which serves as a shoulder for supporting drum sides 76 and 78 (Fig. 3) which are joined together to form the periphery of the drum. The drum side 78, as shown best in Figure 3, begins near the bottom of the drum where it is affixed to the left-hand side 80 of the previously mentioned drum base section 20. Referring to Figures 1 and 3, side 78 extends upwardly past the maximum height of the drum and slightly beyond to an angle member 82 which runs the length of the drum. There is also a part designated 84 extending beyond angle 82. The right-hand drum side 76 is affixed to the right-hand side 86 of drum base section 20. Side 76 at its upper end is bent outwardly to form a lip 88 which faces the angle 82 on side 78. Two or more bolts 90 are then provided for drawing the angle 82 toward the lip 88 to draw up the drum. As previously stated, the drum end plate 70 is provided with the inturned rim 74 and by drawing up the screw 90 at the rear of the drum, the sides 76 and 78 are caused to set firmly on the rim 74.

The front end of the drum is arranged to be supported by similarly clamping, by drawing up the bolt 90 at the front of the drum, onto what is termed a seal ring 92 best shown in Figure 4. The seal ring 92 is affixed, preferably by spot welding, to the inside of the front panel of a cabinet wrap-around which forms the exterior of the complete machine as assembled. The details of this wrap-around will be described more fully hereinbelow, but for the present it will be understood that this part will be rigid and provide a firm support for the front of the drum. It will be understood that in the view shown in Figure 1 the wrap-around and therefore the seal ring 92 are not shown.

The base section 20 of the drum 12 consists of the side panels 80 and 86 already mentioned and also a bottom panel 94, a rear panel 96 and a front panel 98 (Figs. 1 and 4). The upper edges of side panels 80 and 86 are turned outwardly and upwardly to form shoulders 102 and 104, respectively, (Fig. 3) for supporting the lower ends of the drum sides 78 and 76, respectively. Drum sides 76 and 78 are turned downwardly for a short distance as at 106 and 108 and then turned inwardly as at 110 and 112 to form upper guides for a lint trap drawer 113. The forward corners of the horizontal portions 110 and 112 of the drum sides 78 and 76, respectively, are turned upwardly as at 116 and 118 to permit easy guiding of the drawer 114 thereunder.

The lint trap drawer 114 is constructed of perforated metal or screen wire over all or practically all of its surface with the upper edges of the lengthwise sides extending outwardly as at 120 and 122 for passing beneath the edges 110 and 112 of the drum sides forming upper guides and the horizontal portions 124 and 126 of channel members supported on the side panels 80 and 86 for forming lower guides for parts 120 and 124 of the lint drawer 114. It is now thought apparent that the drawer 114 may be readily withdrawn from the drum base section 20 by sliding along the thus formed guides outwardly through an access opening 100 (Figs. 1 and 4) in the front panel 98 of drum portion 20.

Figure 6:
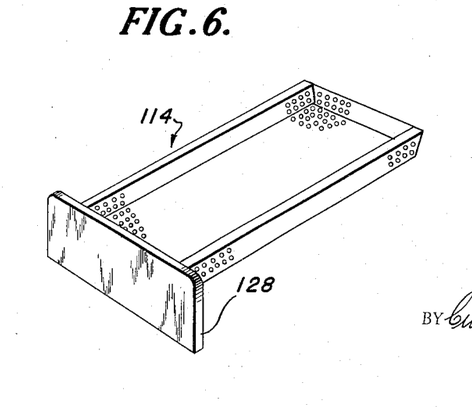
Figure 6 shows a lint collecting trap employed in the dryer.

The lint trap drawer 114 is illustrated in Figure 6 and is shown in this figure to be equipped with a front panel 128 which will be flush with the exterior of the machine as fully assembled. This detail is further shown in Figure 7.

As will be noted primarily from Figures 3 and 4 the bottom panel 94 of the drum base section 20 does not rest upon the framework of the machine. While it could so rest on this framework or be supported therefrom, it has been found preferable, because of assembly reasons, to have the drum supported only on the sleeve 58 at the rear of the drum, by virtue of the aperture 72 in end plate 70, and at the front of the drum on the seal ring 92 which is supported on the front panel of the cabinet wrap-around (described below).

It will be understood that the drum end plate 70, the drum sides 76 and 78 and, of course, the front panel of the outside wrap-around will not be perforated. The only perforated parts of the machine are the lint trap drawer 114 already described and the peripheral surface (described below) of the tub 10.

It is considered important in this invention that the lint trap is at the bottom of the drum so that all lint and other objects within the drum will fall or slide into the trap. Moreover, the stated location of the trap is important because lint is trapped before getting into the ducts and impeller, where serious clogging may occur. Also, the trap as located is readily accessible from the front of the machine at a convenient level well above the floor.

Impeller housing and input and output ducts

The impeller input duct 22 has already been described as attached to the drum base 20. Describing this duct in detail with primary reference to Figures 1, 3 and 4, in the right-hand side panel 86 of the drum portion 20, there is located a rectangular opening 130 around the edges of which fits the input to duct 22. The duct 22 is comprised of a front panel 132 and a rear panel 134, the latter also serving as the front side panel of the impeller housing 18. Between the panels 132 and 134 a duct wrap-around 136 having outwardly turned edges 137 is fixed in place as by welding to panels 132 and 134. The impeller housing is otherwise formed with a side wrap-around portion 142 and a rear panel 146 (Fig. 8), the latter facing the motor 16. The impeller housing 18 is so arranged that an output stack portion designated generally as 148 extends upwardly therefrom for connection to the output duct 24 leading to the vent box 26.

Figure 8:
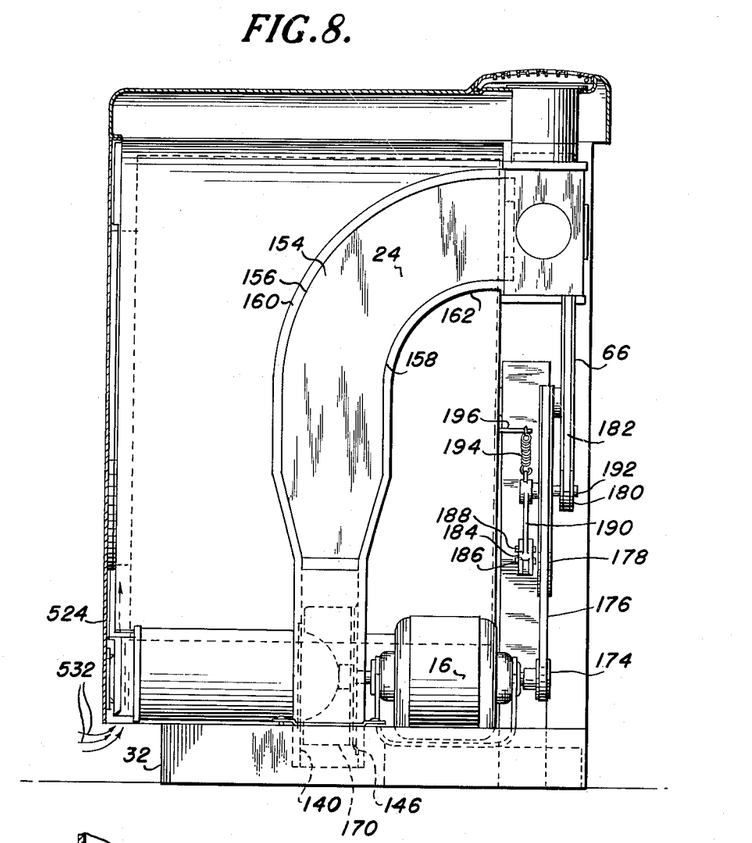
Figure 8 shows a right side elevational view of the dryer with the right-hand side panel of the cabinet removed.

As best shown in Figures 1, 3 and 8, the duct 24 is of rectangular cross-section and, while substantially square where joining the output stack 148 of the impeller housing, narrows in lateral width to a minimum dimension as at 150 and then extends upwardly and curves rearwardly to join the vent box 26 by entering the front side 152 thereof. The duct 24 may be most readily constructed by having the right-hand side panel 154 formed integrally with a front panel 156 and a rear panel 158. For example, the resulting duct having these panels may be formed by pressing the same from a flat sheet of metal. The front panel 156 is provided with an out-turned edge 160 and the rear panel 158 with a similar edge 162. Suitable inter-engaging edges may be provided in the bottom of the duct and attached to similar edges on the upper end of the impeller housing output stack 148 for fastening these units together. The impeller housing 18 may be readily supported from the right-hand base member 34 by means of a bracket 166 which may have a portion (not shown) welded to the impeller housing wrap-around panel 142 and otherwise provided with suitable apertures for receiving bolts 168 for attaching the bracket 166 to the base.

Figure 9:
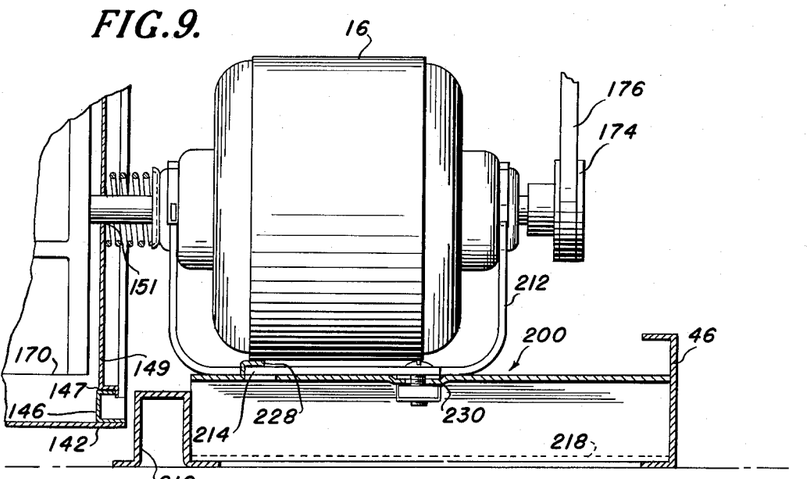
Figure 9 shows a side elevational view of a motor and motor mount which is part of the dryer.

For entering the impeller into housing 18, the rear panel 146 of the housing is provided with an opening 147 (Fig. 9). A cover plate 149 may be fitted into opening 147 after the impeller is in place. Cover 149 has an aperture 151 in which the motor shaft may freely revolve.

*Impeller and tub drive*

As may be best understood with reference to Figures 1 and 8–10, the motor 16 is of a type having a shaft extending from both ends thereof. On the forward end of the shaft there is mounted a blower impeller 170 for rotation within the impeller housing 18. As may be best observed in Figure 8, the impeller is positioned in substantial alignment with the axis of the curved portion of the blower input duct 22 and therefore air may pass from the duct 22 toward the central portion of the impeller 170, there being an aperture 171 (Fig. 3) in previously mentioned panel 134 for permitting air to enter the impeller housing 18 from input duct 22. With the motor arranged to rotate the impeller counter-clockwise as viewed in Figure 3, for example, it will be immediately apparent that air will be sucked from the duct 22 and will be blown upwardly through the duct 24 and into the vent box 26.

The rear shaft extension of motor 116 has mounted thereon a pulley 174 from which a belt 176 is trained upwardly over a large idler pulley 178. Idler pulley 178 is fixedly secured to a shaft to which is also fixedly secured a small idler pulley 180. Over pulley 180 there is trained a second belt 182 which is also trained over the previously mentioned pulley 66 attached to the shaft 60 on which the tumbling tub 10 is mounted. Thus, rotation of the motor will also serve to rotate the tub 10, but at a greatly reduced speed compared to that of impeller 170.

It is desirable to simultaneously adjust the tension in belts 176 and 182. Any convenient type of device for simultaneously tightening the belts may be employed. For example, but without limitation thereto, there is shown an arrangement comprising a first arm 184 (Figs. 3 and 8) having one end pivoted to a pin 186 otherwise fixed to the tub support column 52 and having at its opposite end a pivotal connection as at 188 to a second arm 190, the other end of which rotatably carries a shaft 192 on which the pulleys 178 and 180 are fixed. A spring 194 extends from the end of arm 190 carrying shaft 192 to any convenient support 196 on the rear end plate 70 of the drum. The support 196 should be located upwardly and to the right of the normal operating position of the shaft 192 (as viewed in Figure 3). With this arrangement, it is thought apparent that spring 194 will tend to move the shaft 192 upwardly and to the right. The upward force will tend to tighten the belt 176 and the force to the right as viewed in Figure 3 will tend to tighten the belt 182. Since the shaft 192 is free-floating, so to speak, both belts may be adjusted to predetermined tensions, but without having the degree of tension in one belt dependent upon the length of the other belt, and vice versa. The pivotal joints at 186 and 188 are, of course, to be arranged so that the shaft 192 will always assume a horizontal position regardless of movements upwardly and to the side, as just explained.

*Motor mount*

Figure 10:
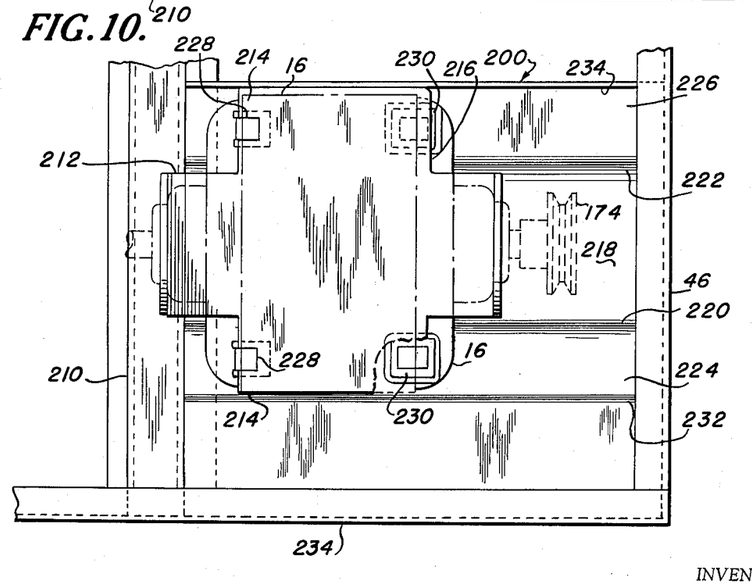
Figure 10 shows a top elevational view of the motor mount of Figure 9.

With particular reference to Figures 9 and 10, the motor 16 is mounted on a novel base so formed that it automatically positions the motor so that the impeller fits properly within the impeller housing 18 and the pulley 174 is properly aligned with the pulley 178.

The motor base is designated generally as 200 in Figures 9 and 10 and extends from the rear base member 46 forwardly to a cross-channel 210, the latter extending from the right-hand base member 34 to the right-hand tub column support channel 48 (Figs. 3, 4, 9 and 10). The motor will be supported on a U-shaped bracket 212 which encircles the bearing housings of the motor on either end thereof and has a horizontal portion extending lengthwise of the motor and beneath same. As best shown in Figure 10, the bracket 212 will be provided with lateral extensions 214 at the front thereof.

The motor mount 200 will be characterized by a central downwardly extending channel having a lower wall 218, a right-hand side wall 220 and a left-hand side wall 222. Extending horizontally from the right-hand side wall 220 will be a right-hand shelf 224 and extending from the left-hand side wall 222 will be a shelf 226. For engaging the forward fingers 214 of the motor bracket 212, there will be provided hook portions 228 raised up from the shelves 224 and 226 in the manner shown in Figures 9 and 10. In the vicinity of the rear of the motor bracket 212, there will be suitable depressions with apertures therein designated 230 for receiving so-called Tinnerman speed grip connectors, or any other type of bolted connection.

The outer edges of the shelves 224 and 226 will be turned upwardly to form shoulders 232 and 234, respectively, these being spaced apart just slightly more than the total widthwise length of the motor bracket 212 plus the extensions 214. It is now thought apparent that the cooperation of the extensions 214 in resting on the shelves 224 and 226, plus the cooperation of the upstanding shoulders 232 and 234, will position the motor correctly both as to height and lateral position. Moreover, the hook portions 228 will serve to correctly position the motor as to insertion of the impeller into the impeller housing. By this arrangement, even if the motor is removed for repairs, there is no danger of an accidental misalignment of the motor when replacing it to damage the impeller and/or impeller housing.

*Tub construction*

The tumbling tub 10 will now be described in detail. As previously stated, this tub is mounted in cantilever fashion from the shaft 60 which is rotatably mounted in the sleeve bearing 58 on column 52. It will be appreciated that to construct a tub of sheet metal which in itself is quite flexible, and at the same time to provide a rigid joint with the shaft to provide a cantilever mount, is not in itself a simple task. Therefore, the structure of the tub about to be described forms an important part of this invention.

The tub primarily consists of a perforated cylindrical section 250 mounted at the front of the machine on a tub front end disc 252 (Figs. 1 and 4) and at the rear on a rear-end tub disc designated as 254 (Fig. 4) which consists of an outer disc 256 and an inner disc 258. The outer disc 256 is circular in plan and is substantially flat except for an inwardly embossed portion 260 near the central portion thereof and three outwardly embossed areas 262 for assisting in maintaining tub baffles 264 in position, to be described more fully below. In the center of the inwardly embossed portion 260, this portion has a circular in-turned flange part 266 for being received within an annular shoulder 268 in tub bush. 62. The bushing 62 is provided with an aperture 272 for receiving the shaft 60 and is further provided with a set screw 274 with locking nut 276 for fixedly securing the bushing to the shaft.

The inner disc 258 is substantially flat over the outer portions thereof and has an out-turned rim 278 upon which the previously mentioned perforated cylinder 250 rests and is attached thereto. However, the inner disc 258 generally extends to an inward positioned area 280 whereat there is an aperture for encircling the shaft 50 and also an in-turned edge 282 for engaging within an annular shoulder 284 in the bushing 62.

In manufacturing the dryer it will be usually preferred to fabricate the tumbling tub before it is assembled onto the shaft 60. For this reason, the outer disc 256 and the inner disc 258 may be welded to the bushing 62 by first welding the bushing to the inner disc 258 as by fillet welds around the bushing 62 as at 286 and then placing the outer disc 256 on the bushing and spot welding to the bushing as at 288. An access opening 290 is provided in the outer disc 256 for tightening the set screw 274 and lock nut 276 when the tub is placed on the shaft 60.

While the inner disc 258 could be generally only of saucer-shape to provide rigidity to the tub 10, it is preferable to rib the disc as will now be described to provide additional rigidity. Referring to Figures 3 and 4, the inner disc 258 is characterized by three stiffening ribs each designated generally as 292. These ribs comprise a flat inclined face 294 which lies between the disc central portion 280 whereat the bushing 62 is affixed to a bend 296 near the outer periphery of the disc. From there to the edge of the disc is a short length 298 at a greater incline to the final plane of the inner disc. In addition to the stiffening ribs there is a generally bowl-shaped area 300 defined by the bend 302 (Fig. 3). This arrangement provides the exact contour of the stiffening ribs 292 as may be readily understood by joint reference to Figures 3 and 4.

The inner disc 258 may be attached to the outer disc 256 at any convenient point, such as 304, where the two discs abut one another.

The inner disc 258 is embossed outwardly as at 306 in area to coincide with the previously mentioned embossed areas 262 of the outer disc 258, so as to accommodate the tumbling baffles 264.

As will be noted from Figure 3, the tumbling baffles 264 are generally triangular in cross-section and serve the purpose of tending to pick up the material in the tub and carry it to an elevated position so that it may then drop more or less diametrically across the tub to permit drying air to pass therethrough. Each of the baffles 264 at either end thereof is provided with in-turned edges 308 for providing surfaces for receiving spot welds to the inner disc 258. At the front ends of the baffles 264 the front disc 252 is similarly provided with outwardly embossed areas here designated 310.

The front disc 252 is characterized by an out-turned rim 312 for receiving the perforated cylinder 250 thereon. Also, radially inward of the rim 312 there is provided an out-turned edge 314 for forming a laundry entrance aperture into the tub. Preferably, the out-turned edge 314 is so formed that an inwardly curved portion 316 is provided for purposes of further stiffening the front disc 252 and also providing a sloped surface for laundry to fall over.

Figure 13:
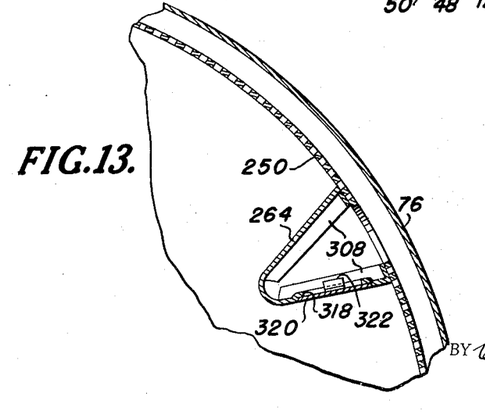
Figure 13 shows a cross-sectional detail of a tumbling baffle which is part of the dryer.

In practice it is found that sometimes some lint will collect on the inner surface of the outer drum 12 which must be cleaned out at intervals. To facilitate such clean-out, one of the baffles 264 is provided with an opening 318 which is normally covered by a removable plate 320. Plate 320 is shown in place in Figure 4, but is removed in Figure 3. A detailed view is also shown in Figure 13. The plate 320 may be provided with an offset lip member 322 at the rear end thereof and with a suitable screw means 324 at the forward end thereof. With this arrangement one may readily reach through the door of the machine, unfasten the screw means and remove the plate 320. Thereupon, a large piece of cloth such as a towel may be stuffed through the opening 318 and through opening 319 in cylinder 250 to more or less fill the space along the length of the tub and to wipe against the inner surface of the outer drum 12. The tub may then be revolved by hand, by clasping one of the baffles and turning through one revolution, ending the movement when the towel is pushed the elected length into the lint collecting drawer 114. Thus, the machine has been cleaned and the lint placed in the lint drawer 114 for removal. Thereupon the cleaning cloth may be withdrawn and the plate 320 reinserted.

In the event that any moisture should collect in the space between the inner disc 258 and the outer disc 256, there may be provided at spaced intervals about the tub, outwardly embossed channels 326 in the outer disc 256 to thereby provide drainage passages 328 (Fig. 4). With at least three such passages positioned at equally spaced points about the tub, as the tub is revolved in operation, there will be ample opportunity for any water to run out. Such water would in general drain into the base section 20 of the drum 12 and thereafter would be evaporated into the hot air passing through this area and out through the exhaust duct system.

*Vent box*

The vent box 26 will now be described in detail with reference particularly to Figures 1, 11 and 12. This box consists of a bottom 350 of rectangular plan and having upwardly turned edges 352. Within the edges 352 and upstanding therefrom is a wrap-around member 354 forming four sides of a rectangular box. In the forward side of the box there is a rectangular opening 356 for permitting entry of the duct 24 leading from the impeller housing. The edges 160 and 164 of the duct may terminate as at 358 a short distance before the end of the duct so that the end portion 360 extends into the vent box 26. The edges 358 may be turned to one side as at 362 (Fig. 1) for welding or screwing to the box, as desired. Also, the lower left-hand corner of the forward face of the vent box 26 may be secured to the drum back plate 70 by a convenient means. Considering now that the duct work is securely fastened by means of the bracket 166 at the impeller housing 18 to the base member 34 and the drum back plate 70 is mounted on the column 52, it is thought to be clear that the box is substantially mounted.

Figure 11:
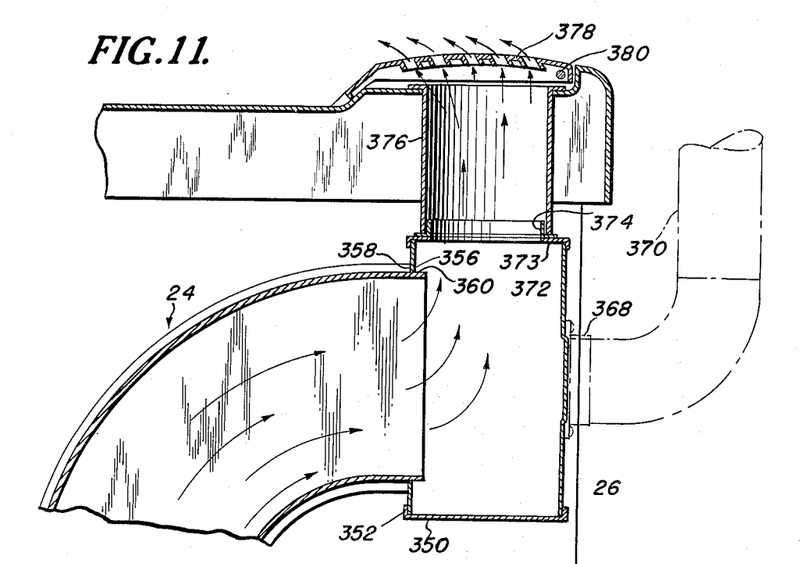
Figure 11 shows a side section elevational view partly in section of a vent box which is part of the dryer.
Figure 12:
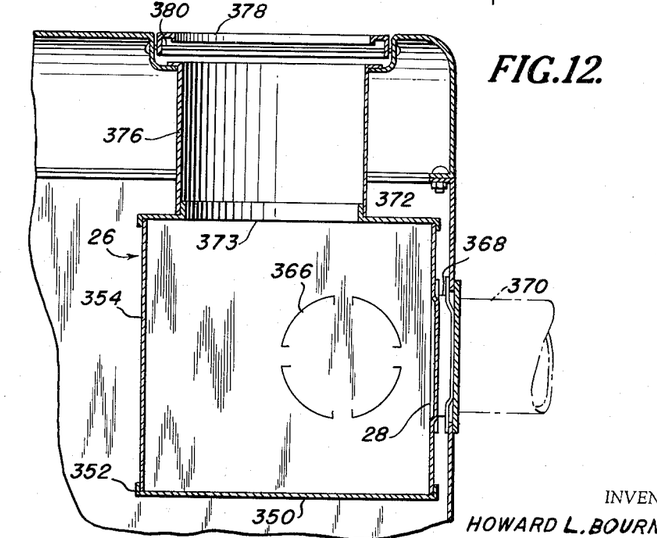
Figure 12 shows a front section elevational view of the vent box in Figure 11.

The rear of the box is provided with a knock-out section 366 (Fig. 12) over which may be affixed a pipe joint adapter 368 in case the user of the machine wishes to vent from the rear of the machine into a vent pipe 370 (Fig. 11). Similarly the right-hand side of the vent box 26 is provided with the previously mentioned knock-out section 28 to which a pipe joint adapter such as 368 may be attached to receive a pipe 370 (Fig. 12) for venting to the side of the machine.

In the event the user of the machine does not desire to or cannot have pipe 370 leading outside the building in which the dryer is located, vent box 26 is also provided with a top 372 having a rectangular opening aperture 373 defined by up-turned edge 374 over which may be placed a vent duct 376 leading through a grill 378 in the top of the dryer. It will be understood that the opening 373 may be capped if not to be used.

It is of particular importance in this invention that in venting the machine into the room in which it is located, this venting is done upwardly rather than toward the floor or the walls which may surround the machine. It has been found in various commercial machines which vent toward the floor or walls that moisture issuing in the air stream tends to condense on these surfaces and lint which may escape through the lint trap tends to collect in the condensing moisture to form objectionable masses of lint which may actually build up undetected to block the proper exhaust of the moist air.

It will be further understood that should the machine first be used with the rear or side vents, and the situation then changed, any convenient caps may be placed over the apertures formed by the knocking-out of the original knock-out sections of the vent box sides.

While the top of the dryer will be described fully hereinbelow, it may be noted at this point that immediately above the vent 376 the grill 378 is hinged about pin 380 and may be opened upwardly to permit convenient access for reaching downwardly through the duct 376 and into the vent box 26 to clean the latter, if necessary. It is intended that the aperture defined by edges 376, as well as the grill door 378, be of such size as to permit the user to reach into the vent box 26 as stated. It will be noted that the louvres in grill door 378 are so formed as to direct the discharge air upwardly and forwardly through a path which prevents the moisture laden air from being directed to adjacent walls which due to the temperature thereof could cause the accumulation of unsightly, destructive condensation.

*Combustion chamber*

The combustion chamber 14 will now be described in detail. Referring first to Figures 1 and 3, the chamber has therein an elongated burner 400 so arranged that combustion flames will appear thereabove as at 402. Air to be heated will be drawn upwardly from an entry point along the bottom front of the machine as will be described hereinbelow. This air coming upwardly as indicated by arrows 404 may follow several paths. The primary air will be mixed with gas in a conventional manner to the rear of the machine and will enter the burner 400 through manifold 404. To the left-hand side of the burner 400, as viewed in Figure 3, there is provided a shield member 406 and to the right-hand side of the burner a baffle 408. These members extend the length of the combustion chamber and cause secondary air as designated by arrow 410 to flow closely adjacent the sides of burner 400 to mingle with the combustion gases from flames 402. Thence, the secondary air passing the flames will mingle with other air designated by arrows 412 passing upwardly between the outer surface of shell 406 and the inside of combustion chamber inner top 414. The arrangement of shield member 406 and burner baffle 408 with relation to the intake air opening along the lower section of combustion chamber top 414 is so designed as to permit a relieving of negative air pressure caused by the impeller sufficient enough to allow the burner to be turned down to 20% of its rated input and still permit a flame along the entire port area of the burner which does not "pull off" the burner ports, thus extinguishing the flame. That is, the available paths for secondary air (for example, the entry at 407, Fig. 3) are large enough so that there is not undue inclination of air to move through manifold 404 to effect a "pull off" of the flames. Air 412 is mingled with and heated by air passing upwardly from flames 402, then travels to the right beneath the inner top 414 to an opening 416 and a further opening 418 in the drum side 78. The air is then drawn through the perforated cylinder 250 downwardly and through the wet laundry to the vicinity of the lint trap drawer 114 and thence out through the impeller and duct work system.

The combustion chamber is further provided with an outer top 420 through which additional air designated by arrow 422 is moved to also pass through the opening 418 in the drum side 78. Some of the air 422 passes between the outside of the combustion chamber inner top 414 and combustion chamber shield 424, and this air feeds into the space beneath the outer top 420 and the inner top 414, as previously described. The purpose of the air passing beneath shield 424 and beneath the outer top 420, is to insure that the top of the machine, where a user may place his hands or place various articles, will not become unduly hot. At the same time, the air 422 will be heated to a certain extent in performing the cooling function. There will also be an additional space 426 between the top of the outer combustion chamber top 420 and the actual top of the machine to provide further insulation.

The entire combustion chamber may be mounted on a bottom panel 428 which in assembly may be hooked over the left-hand edge 430 of an opening 432 in the drum side 78 forming the air entry opening 418. Spot welded to the bottom panel of the combustion chamber at the air entry opening 418 and along the hooked left-hand edge 430 is a distribution baffle 431 which preferably extends over approximately two-thirds of the length of opening 418 and permits the distribution of incoming warm air to be directed into and through the perforations in tumbler tub 250. Without this baffle, with the tub heavily loaded, the air from passage 418 may tend to travel between the tub and drum, rather than through the tub. Thus hooked at this point, the other end 434 of the bottom 428 may be fastened to the drum side 78, preferably by use of metal screws.

*Combustion and timing control mounting*

An arrangement for mounting control apparatus will now be described. While a description of the mounting means will be given in considerable detail, the controls per se will not be described in detail since they do not constitute a part of the present invention and many suitable control arrangements are commercially available.

Figure 14:
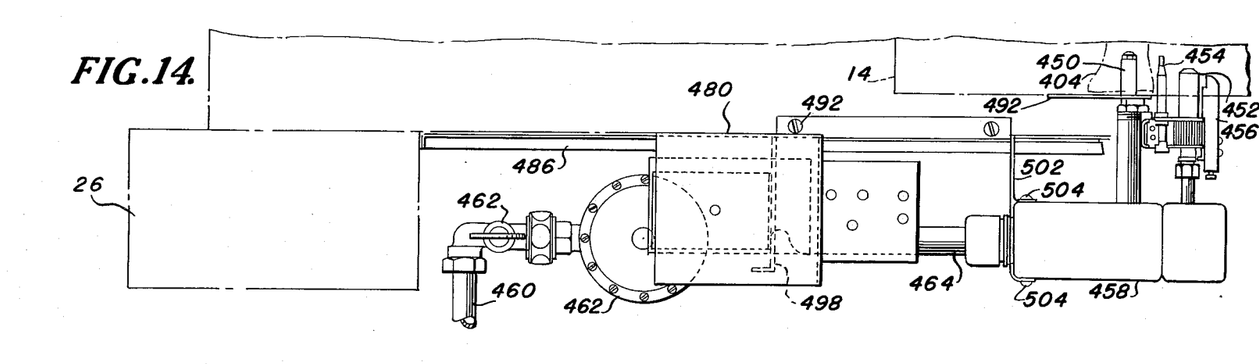
Figure 14 shows a top plan view of dryer control apparatus and mounting means therefor.
Figure 15:
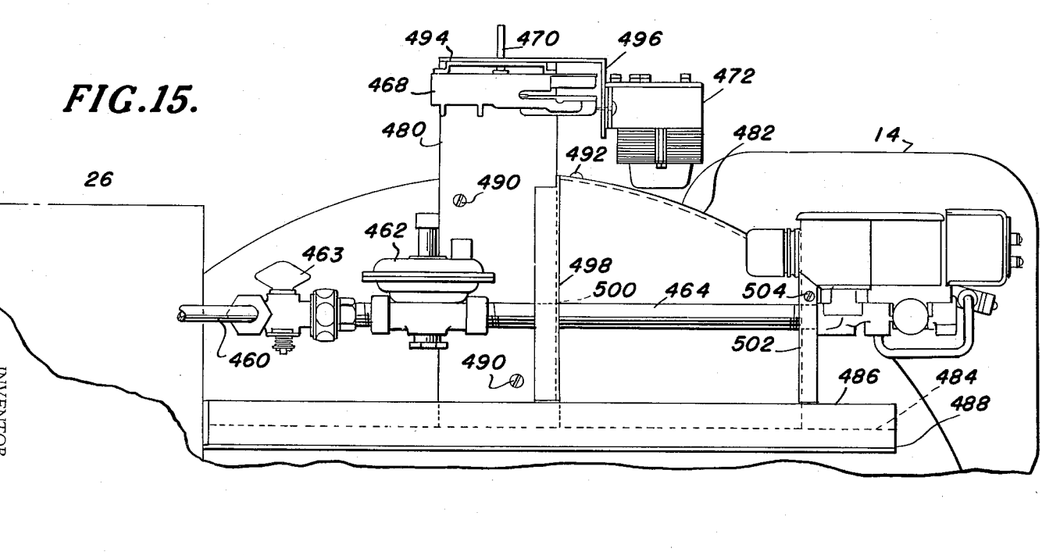
Figure 15 shows a rear elevational view of the controls and mounting means of Figure 14.

Referring to Figures 14 and 15, the combustion controls may include an orifice device 450 for injecting gas into the previously mentioned manifold 404, a pilot jet device 452, a thermocouple 454 for detecting the condition of the pilot flame, and an electric pilot iginition 456. The just-mentioned components may be under the control of a solenoid valve arrangement 458 for controlling the input of gas arriving from an input line 460 and manually operable gas stop 463 through pipe line 464 and pressure regulator 462.

In addition the dryer may be equipped with a timer 468 having an upwardly extending shaft 470 for receiving a control knob. Also, there may be a transformer 472 for providing suitable low voltage for the igniter pilot. For temperature responsive control of the machine, there is provided a first temperature limit switch 474 which is located at the top center of the drum. This temperature limit switch is connected in the control circuit to serve primarily as an input device which will function only in the event of failure of a second temperature limit switch 476 which is responsive to the temperature within the drum. The limit switch 476 is located immediately to the left of the drum section 20, as is shown in Figure 3. The location of limit switch 476 near the air exit from the drum is an important part of the invention, since as here located, switch 476 will not have its actions modified by "dilution" of air which may enter into the impeller and the exhaust ducts if the lint trap door is partly open. The location of the temperature limit swich 474 a the top of the drum is also important inasmuch as that in that position it is immediately in advance of the hot air issuing from the combustion chamber. Thus, the limit switch 474 will respond immediately to dangerous temperatures within the drum, if the impeller should stop moving air through the machine.

Controls as just described are available commercially and it is thought that further description thereof is not necessary, inasmuch, as above stated, these controls per se form no part of the present invention other than the mounting means which will be described below. Those skilled in the art will well understand how such controls may be interconnected and operated. Briefly, a desirable sequence of operations is as follows: In operation the pilot light will normally be readied for igniting the burner. Then, with the door closed to complete a safety circuit, turning on of the timer 468 will ignite the main burners in the combustion chamber, and also energize the motor 16 for driving the tub and impeller. Operation will continue until the timer turns off the circuits or until the temperature responsive switch 476 in the vent box turns off the main combustion burners, but leaves the motor 16 in operation.

For mounting the controls there are provided two mounting brackets, one designated 480 for supporting the timer 468 and transformer 472, and the other 482 for supporting the solenoid valve 458 and the main gas orifice device 450, thermocouple 454, pilot jet device 452 and pilot ignition 456. The mounting bracket 482 also laterally supports the pipe 464 on which the pressure regulator 462 and manually operable gas stop 463 are mounted. By this arrangement the latter elements are removed with the bracket 482. Both of the brackets 480 and 482 are arranged to rest against an offset ledge 484 in a horizontal bracket 486 having a lower portion 488 flush against and spot-welded or otherwise affixed to the drum end plate 70. The offset 484 may be best observed in Figure 4. After being seated in the bracket 486, the brackets 480 and 482 may then be otherwise secured to the drum by suitable screws 490 and 492.

It will be noted that the bracket 480 has a vertical rearward extension 494 at the top thereof for supporting the timer 468 and a downwardly extending portion 496 extending from the horizontal portion 494 for supporting the transformer 472.

It will be noted that the bracket 482 has a rearwardly extending portion 498 having an aperture 500 therein for supporting the pipe 464. In addition the bracket 482 has a second rearwardly extending portion 402 fixed to the solenoid valve 458 by screws 504 for supporting this unit and the other components mounted thereon, as has been described.

*Cabinet wrap-around*

The sheet metal cabinet wrap-around forming the outer surface of the machine will now be described. This wrap-around is designated generally as 520 (Fig. 2) and consists of a right-hand panel 522, a front panel 524 and a left-hand panel 526 all formed by the bending at the necessary corners thereof of a single piece of sheet metal. Once formed, the wrap-around is fixed to the base 30 by means of suitable screws 528 along the right-hand base member 34 and the left-hand base member 36. The upper edges of the panels 522, 524 and 526 may be turned inwardly as at 530 to provide an inward horizontal surface on which to rest the top of the machine.

As may be most readily observed in Figure 8, the front panel 524 of the wrap-around 520 is positioned considerably forward of the front base member 32 and therefore there will be ample space near the front left-hand corner of the machine for permitting entry of air, as indicated by arrows 532, under the front of the wrap-around and upwardly along the left side of the machine and into the combustion chamber and the various passages therein.

The front panel 524 of the wrap-around is characterized by an opening for receiving a door, through which opening laundry may be inserted into the tumbling tub 10. The front panel 524 is also characterized by an opening through which the lint collecting drawer 114 may be inserted.

Referring first to the laundry entrance doorway, the panel 524 is first bent inwardly at 534 (Fig. 4) to provide an inward extension 536 forming a frame in which the door designated generally as 538 may fit. As may be observed in Figure 2, the opening defined by edge 536 at bend 534 is of square or rectangular plan. The panel 524 is then again bent to lie in a vertical plane forming a surface 540 and an inward portion 542 further defines a circular aperture for introducing the laundry into the tub 10.

Figure 2:
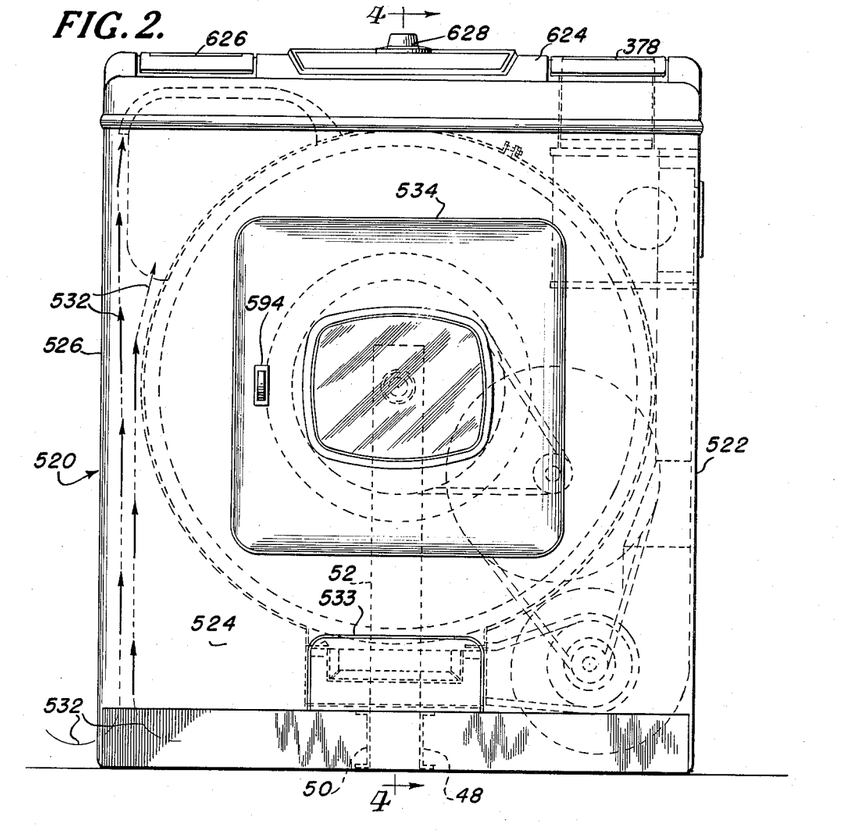
Figure 2 shows a front elevational view of the complete dryer.
Figure 7:
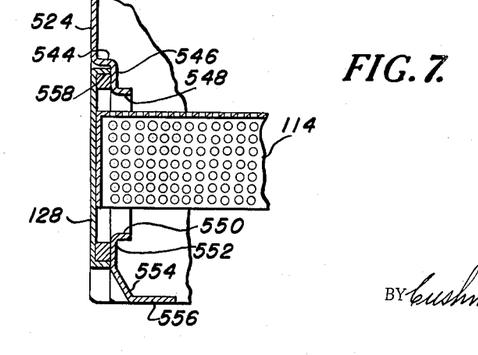
Figure 7 shows a detail of the lint collecting drawer of Figure 6 in place in the dryer.

Near the bottom of panel 524, as shown in Figure 2 and also in detail in Figure 7, there is a rectangular opening 533 defined by a first inward bend 544, a vertical section 546 and a further inward extension 548, for forming the upper edge of the lint trap door entry aperture. Beneath the lint trap door 128 there is an inward vertical bend 550, a vertical section 552 and a bevelled portion 554 and finally the horizontally inturned lower edge 556 of the front panel 524. The front plate 128 of the lint trap drawer 114 is provided with in-turned upper and lower edges 558, which has affixed to its inner surface a suitable felt gasket 559 for sealing against the vertical portions of 546 and 552 of the wrap-around front panel 524, and these are of such dimension as to cause the drawer or front plate 128 to be flush with the wrap-around front panel 524 when the drawer is in place.

*Door*

The laundry entrance door is formed by the joining together of an outer panel 570 (Fig. 4) and an inner panel 572. The plan of panel 570 and also panel 572 as viewed in Figure 2 may be either square or rectangular and the panels are spaced apart by virtue of overlapping edges 574 on panel 570 and 576 on panel 572.

Figure 16:
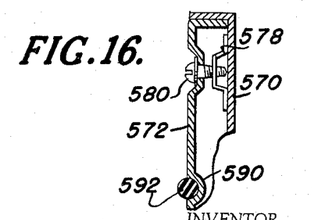
Figure 16 shows a detail of door construction which forms part of the dryer.

As shown in Figure 16 a threadable lug 578 may be secured to the inner surface of outer panel 570 at substantially each corner thereof and a screw 580 may pass through the inner panel 572 for drawing the two panels together.

The door will be provided with a transparent window 582 of suitable heat resistant glass and this may have an edge bead 584 which may be clamped between a seat 586 in the inner panel 572 and a clamping rim 588 on the outer panel 570.

The inner panel is also characterized by an annular detent 590 of semi-circular cross-section and having cemented therein a resilient gasket 592 for sealing the doorway when the door is closed and latched.

Any suitable door latch may be employed and the handle thereof is designated 594 and shown in Figure 2. It may further be mentioned that any suitable hinges (not shown) may be employed at the side of the door opposite the latch, so that the same may be swung out horizontally. It will furthermore be appreciated that, with the door of symmetrical plan, provision may be made for swinging the door from either side as convenience may dictate by using the same door and the same hinge and latch parts, with means for fastening same to either side of the doorway.

It will be noted that the inwardly extending edge 554 defining the laundry entrance through the front panel of the wrap-around, overlaps with the forwardly extending edge 314 of the rotating tumbling tub.

*Cabinet top*

The cabinet top of the dryer is designated generally as 610 and may be stamped from a single piece of sheet metal to have a top panel 612 and downwardly extending side panels for forming a right-hand side panel 614, a front panel 616, a left-hand side panel 618 and a rear panel 620. Each of these side panels may further be characterized by an inwardly turned edge 622 for lying on the similarly inturned upper edges of the wrap-around panels 522, 524 and 526. The top 610 is further provided with an upraised section 624 along the rear of the machine for receiving the previously mentioned grill 378 for gaining access to the vent box 26 and also to a grill 626 which may be rotated upwardly about a hinge line at the rear for gaining access to the pilot light and associated devices. The timer control shaft 470 will also project through the central part of the raised portion 624 for receiving a timer control knob 628.

For assembling the top to the wrap-around without the use of obvious fastening means at the front and sides of the machine, the in-turned edge 530 of the front wrap-around panel 524 is so designed as to receive suitable friction catches (not shown) which are an integral part of the top and so spaced as to form a friction fit with the dryer cabinet when the top is in its proper place. With the top thus in place, the rear of the top may then be securely held to the side panels of the wrap-around by means of these friction catches.

To finally enclose the machine, a back panel 634 may be secured by suitable metal screws to the inwardly extending rear edges of the wrap-around side panels 522 and 526.

Conclusion

From the foregoing it is thought to be apparent that the laundry dryer according to the present invention constitutes improvements in all of the particular components and combinations thereof described and hereinafter claimed. It is to be understood that many modifications of the invention will occur to those skilled in the art upon reading the foregoing description. Therefore, it is intended that the scope of the invention be determined from the appended claim.

What is claimed is:

Apparatus of the class described comprising front, rear and side members making up a substantially rectangular base, two cross members running lengthwise of the base between the front and rear base members and spaced apart a predetermined relatively short distance, a column extending upwardly from between the facing sides of the cross channels adjacent the rear base member end, a laundry tumbling tub rotatably mounted on a shaft extending through a bearing mounted in said column, said shaft and bearing extending horizontally, a drum surrounding said tub, the drum comprising a cylindrical section mounted on a rear end plate, said end plate being supported on the column, a cabinet wrap-around supported from said base, a seal ring mounted on said cabinet wrap-around, the forward end of the cylindrical section of said drum being mounted on said seal ring, a drum base section at the bottom of said drum and extending the full length of the drum, a lint collecting drawer insertable into said drum base section and extending substantially the full length thereof, a motor, mounting means for supporting said motor, the motor mounting means being fixed to at least one of the members forming said base, an impeller mounted on a shaft extending from the motor, the motor being positioned parallel to the tub and immediately to one side of the rearward portion of drum base section, a housing surrounding the impeller, a duct leading from the forward end of the drum base section to the impeller housing, a shaft extending from the end of the motor opposite the end on which the impeller is mounted, a pulley on said opposite shaft end, idler speed reducing pulleys of differing diameters supported from said column, a pulley mounted on said tub shaft and fixed thereto at the rear of said column, a first belt running from the motor pulley to the larger of the idler pulleys, a second belt running from the smaller of the idler pulleys to the tub pulley, the arrangements being such that the motor may drive the impeller mounted on the shaft thereof and also the tumbling tub with a minimum of belting.

References Cited in the file of this patent
UNITED STATES PATENTS

| | | |
|---|---|---|
| 1,253,520 | Ostertag | Jan. 15, 1918 |
| 1,801,735 | Glatt | Apr. 21, 1931 |
| 2,209,477 | Reibel | July 30, 1940 |
| 2,333,000 | Gayring | Oct. 26, 1943 |
| 2,349,668 | Marker et al. | May 23, 1944 |
| 2,363,467 | Strobridge | Nov. 21, 1944 |
| 2,460,422 | Koppel | Feb. 1, 1949 |
| 2,498,181 | Reiter | Feb. 21, 1950 |
| 2,547,238 | Tremblay | Apr. 3, 1951 |
| 2,654,961 | Manecke | Oct. 13, 1953 |
| 2,686,978 | Herbster | Aug. 24, 1954 |